US012760136B2

(12) United States Patent
Vielhaber

(10) Patent No.: US 12,760,136 B2
(45) Date of Patent: Oct. 13, 2026

(54) SCANDIUM CATALYST SYSTEM AND PROCESS FOR PRODUCING ETHYLENE/BUTADIENE COPOLYMER

(71) Applicant: G-3 Chickadee Purchaser, LLC, Akron, OH (US)

(72) Inventor: Margaret Flook Vielhaber, Kent, OH (US)

(73) Assignee: G-3 CHICKADEE PURCHASER, LLC, Akron, OH (US)

( * ) Notice: Subject to any disclaimer, the term of this patent is extended or adjusted under 35 U.S.C. 154(b) by 559 days.

(21) Appl. No.: 18/476,747

(22) Filed: Sep. 28, 2023

(65) Prior Publication Data

US 2025/0109230 A1 Apr. 3, 2025

(51) Int. Cl.

| | |
|---|---|
| ***C08F 210/02*** | (2006.01) |
| ***C08F 4/52*** | (2006.01) |
| ***C08F 4/54*** | (2006.01) |
| ***C08F 236/06*** | (2006.01) |

(52) U.S. Cl.

CPC .............. *C08F 236/06* (2013.01); *C08F 4/52* (2013.01); *C08F 4/545* (2013.01); *C08F 210/02* (2013.01)

(58) Field of Classification Search

None

See application file for complete search history.

(56) References Cited

U.S. PATENT DOCUMENTS

| | | | |
|---|---|---|---|
| 8,962,743 B2 | 2/2015 | Kaita et al. | |
| 8,962,744 B2 | 2/2015 | Horikawa et al. | |
| 9,056,936 B2 | 6/2015 | Horikawa et al. | |
| 10,280,243 B2 | 5/2019 | Wu et al. | |
| 2014/0179861 A1 | 6/2014 | Horikawa et al. | |
| 2016/0229928 A1 * | 8/2016 | Cui | C07F 19/00 |
| 2018/0291131 A1 * | 10/2018 | Wu | C08F 236/06 |
| 2019/0218328 A1 | 7/2019 | Wu et al. | |

FOREIGN PATENT DOCUMENTS

| | | |
|---|---|---|
| JP | 2012131965 A | 7/2012 |
| WO | 2015051569 A1 | 4/2015 |

OTHER PUBLICATIONS

Li et al. "Alternating and Random Copolymerization of Isoprene and Ethylene Catalyzed by Cationic Half-Sandwich Scandium Alklys", Organometallic Chemistry Laboratory, Riken Advanced Science Institute, J. Am. Chem. Soc. 2009, 131, 13870-13882.

Extended European Search Report for Application No. 24202845.4, dated Feb. 19, 2025.

* cited by examiner

*Primary Examiner* — Richard A. Huhn

(74) *Attorney, Agent, or Firm* — Jackson Walker LLP; Leisa Talbert Peschel

(57) ABSTRACT

A process for producing an ethylene-butadiene copolymer includes copolymerizing butadiene with ethylene in the presence of a catalyst system. The catalyst system includes tris[(trimethylsilyl)methyl]scandium and an aluminum-containing activator.

20 Claims, 3 Drawing Sheets

SCANDIUM CATALYST SYSTEM AND PROCESS FOR PRODUCING ETHYLENE/BUTADIENE COPOLYMER

BACKGROUND

Current catalysts used to prepare cis-polybutadiene do not incorporate appreciable amounts of ethylene.

It would be desirable to develop new systems and methods for producing ethylene/butadiene copolymers.

BRIEF DESCRIPTION

Disclosed, in some embodiments, is a process for producing an ethylene-butadiene copolymer. The process includes copolymerizing butadiene with ethylene in the presence of a catalyst system. The catalyst system includes tris[(trimethylsilyl)methyl]scandium; and an aluminum-containing activator. The catalyst system may further include a borate coactivator. In some embodiments, the borate coactivator comprises a salt of tetrakis(3,5-bis(trifluoromethyl)phenyl)borate and/or a salt of tetrakis(pentafluorophenyl)borate. The aluminum-containing activator may include an aluminoxane activator. In some embodiments, the aluminoxane activator includes a modified aluminoxane activator. The aluminoxane activator may include a methylaluminoxane activator. In some embodiments, the methylaluminoxane activator is a modified methylaluminoxane activator. The aluminum-containing activator may include MMAO-12. In some embodiments, the aluminum-containing activator comprises a trialkyl aluminum activator; and the catalyst system further includes a borate coactivator. The trialkyl aluminum activator may include triisobutylaluminum. In some embodiments, a molar ratio of the aluminum-containing activator to tris[(trimethylsilyl)methyl]scandium is in a range of about 20 to about 1000, about 50 to about 500, or about 75 to about 200. The process may further include quenching a reaction product of the copolymerization. In some embodiments, the process further includes drying the quenched reaction product. The reaction product may be quenched with a quenching composition containing isopropanol and butylated hydroxytoluene.

Disclosed, in other embodiments, is a process for producing an ethylene-butadiene copolymer. The process includes providing a first composition containing butadiene and ethylene to a reactor; providing a second composition containing tris[(trimethylsilyl)methyl]scandium and a first aliquot of an aluminum-containing activator to the reactor; and copolymerizing the butadiene with the ethylene. The first composition may further include a second aliquot of the aluminum-containing activator. In some embodiments, the process further includes quenching a reaction product of the copolymerization; and drying the quenched reaction product. The aluminum-containing activator may include a modified aluminoxane activator; or the aluminum-containing activator may include a trialkyl aluminum activator and at least one of the first composition and the second composition may further include a borate coactivator.

These and other non-limiting aspects and/or objects of the disclosure are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
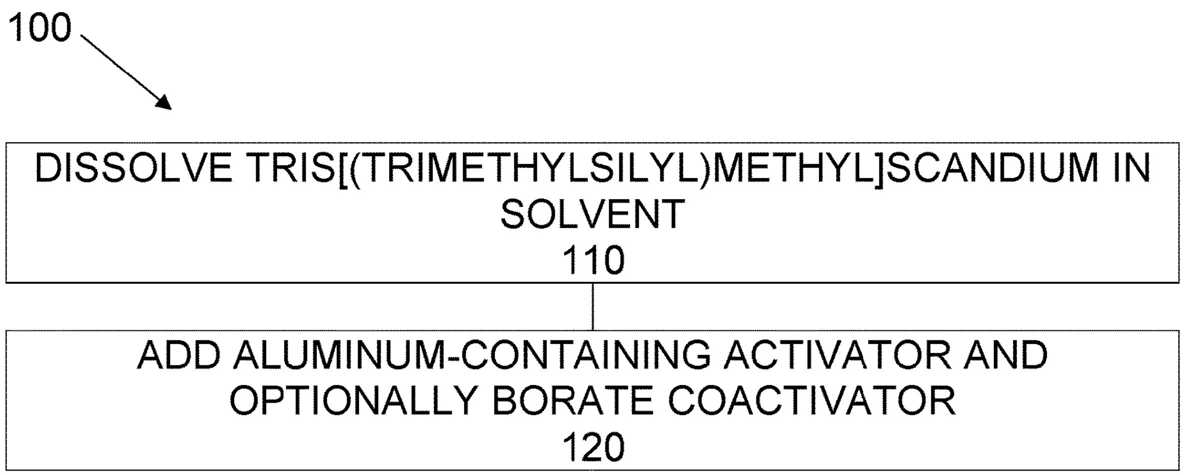
FIG. 1 is flow chart illustrating a non-limiting example of a process for producing a catalyst composition in accordance with some embodiments of the present disclosure.

The present disclosure may be understood more readily by reference to the following detailed description of desired embodiments included therein and the drawings. In the following specification and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Methods and materials are described below, although methods and materials similar or equivalent can be used in practice or testing of the present disclosure. All publications, patent applications, patents, and other references mentioned herein are incorporated by reference in their entirety. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The present disclosure relates to a process for producing an ethylene-butadiene copolymer, a catalyst composition used in the production process, and articles formed from compositions including the copolymer.

It was unexpectedly found that the catalyst composition, when exposed to a mixture of butadiene and ethylene, was able to produce a copolymer with up to 6 mol % ethylene.

The scandium catalyst system is a simpler and likely less expensive variation of catalysts reported in the literature.

FIG. 1 is flow chart illustrating a non-limiting example of a process 100 for producing a catalyst composition in accordance with some embodiments of the present disclosure. The process 100 includes dissolving tris[(trimethylsilyl)methyl]scandium in a solvent 110.

An aluminum-containing activator and optionally a borate coactivator 120 are added. The solvent may be a hydrocarbon solvent. In some embodiments, the solvent includes one or more aromatic, paraffinic, and/or cycloparaffinic compounds. The solvent may contain from 4 to 10 carbon atoms. Non-limiting examples include butane, pentane, isooctane, cyclohexane, n-hexane, benzene, toluene, xylene, ethylbenzene, and diethylbenzene. Mixtures of two or more hydrocarbon solvents may also be utilized.

The aluminum-containing activator may be an aluminoxane activator. The aluminoxane activator may be an alkylaluminoxane activator, such as a methylaluminoxane activator.

The aluminoxane activator may be a modified aluminoxane activator, such as a modified methylaluminoxane activator.

In some embodiments, the methylaluminoxane activator is modified by replacing a portion of the methyl groups with linear or branched alkyl groups having from 3 to 10 carbon atoms. In some embodiments, 40 mol % or less (e.g., 5 to 35 mol %) of the alkyl groups may be replaced.

Non-limiting examples of modified methylaluminoxane activators include MMAO-12, MMAO-3a, and MMAO-7.

The aluminum-containing activator may include at least organoaluminum compound, such as a triorganoaluminum compound. The triorgano aluminum compound may be a trialkyl aluminum compound.

Non-limiting examples of aluminum-containing compounds include trimethylaluminum, triethylaluminum, tri-n-propylaluminum, triisopropylaluminum, tri-n-propylaluminum, triisopropylaluminim, tri-n-butylaluminum, triisobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, and diethylbenzylaluminum.

A molar ratio of the aluminum-containing activator to tris[(trimethylsilyl)methyl]scandium may be in a range of about 20 to about 1000, about 50 to about 500, or about 75 to about 200.

The borate coactivator may include one or more of trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethylanilinium tetra-(3,5-bis(trifluoromethyl)phenyl) borate, N,N-dimethyl-(2,4,6-trimethylanilinium) tetraphenylborate, trimethylammonium tetrakis(pentafluorophenyl) borate, triethylammonium tetrakis(pentafluorophenyl) borate, tripropylammonium tetrakis(pentafluorophenyl)borate, tri(n-butyl)ammonium tetrakis (pentafluorophenyl)borate, tri(secbutyl)ammonium tetrakis (pentafluorophenyl)borate, N,N-dimethylanilinium tetrakis (pentafluorophenyl)borate, N,N-diethylanilinium tetrakis (pentafluorophenyl) borate, N,N-dimethyl-(2,4,6-trimethylanilinium) tetrakis(pentafluorophenyl) borate, trimethylammonium tetrakis-(2,3,4,6-tetrafluorophenyl)borate. N,N-dimethylanilinium tetrakis-(2,3,4,6-tetrafluorophenyl) borate; di-(i-propyl)ammonium tetrakis(pentafluorophenyl) borate, dicyclohexylammonium tetrakis (pentafluorophenyl) borate; triphenylphospnonium tetrakis (pentafluorophenyl) borate, tri(o-tolyl)phosphonium tetrakis (pentafluorophenyl) borate, tri(2,6-dimethylphenyl) phosphonium tetrakis(pentafluorophenyl) borate; and/or N,N-dimethylanilinium tetrakis(3,5-bis(trifluoromethyl) phenyl)borate.

A molar ratio of the aluminum-containing activator to the borate coactivator may be in a range of about 20 to about 1000, about 50 to about 500, or about 75 to about 200.

The coactivator may be used stoichiometrically relative to the main metal catalyst. A molar ratio of the borate coactivator to tris[(trimethylsilyl)methyl]scandium may be about 1.

Figure 2:
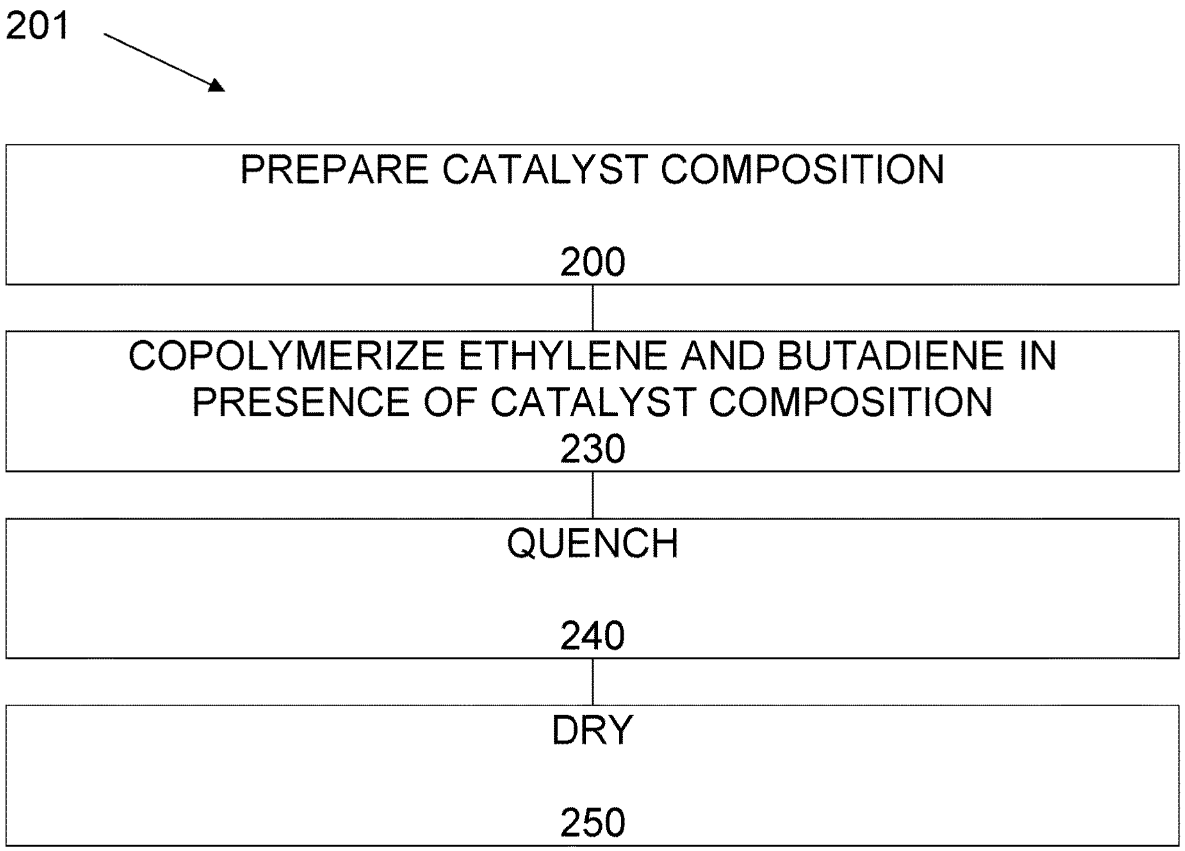
FIG. 2 is a flow chart illustrating a non-limiting example of a process for producing an ethylene-butadiene copolymer in accordance with some embodiments of the present disclosure.

FIG. 2 is a flow chart illustrating a non-limiting example of a process 201 for producing an ethylene-butadiene copolymer in accordance with some embodiments of the present disclosure. The process 201 includes preparing a catalyst composition 200, copolymerizing ethylene and butadiene in the presence of the catalyst composition 230, quenching 240, and drying 250. The ethylene-butadiene copolymer may contain from about 1 mol % to about 20 mol %, about 1 mol % to about 10 mol %, or about 1 mol % to about 7 mol % ethylene.

Optionally, the catalyst composition 200 is prepared as discussed above for process 100. The catalyst composition includes tris[(trimethylsilyl)methyl]scandium, an aluminum-containing activator, and optionally a borate coactivator.

The ethylene and butadiene reacted during the copolymerization 230 may be provided to a copolymerization reactor before the catalyst composition, concurrently with the catalyst composition, and/or after the catalyst composition.

Copolymerization 230 may include providing ethylene to a polymerization vessel containing butadiene. The ethylene may be provided by flushing a solution containing butadiene in a solvent with ethylene. The ethylene gas may be provided to saturate the butadiene. The catalyst composition is provided to the polymerization vessel. The vessel may be heated to a temperature in the range of about 30° C. to about 150° C., from about 30° C. to about 100° C., or from about 40° C. to about 90° C., for a time period in the range of about 15 minutes to about 36 hours, about 20 minutes to about 12 hours, or about 20 minutes to about 3 hours.

The quenching 240 includes providing a quenching composition to the polymerization vessel. The quenching composition may contain an acidic proton source and/or a protic quench agent. An antioxidant may be included in the quenching composition and/or provided to the polymerization vessel concurrently or subsequently. In some embodiments, the quenching composition contains isopropanol and butylated hydroxytoluene (BHT). In some embodiments, an excess of isopropanol or other protic solvent is added along with 0.1 phr to 1.0 phr, 0.25 phr to 0.75 phr, or about 0.5 phr of stabilizer (e.g., BHT).

Drying 250 evaporates the solvent and may be passive or active.

Articles produced using the ethylene/butadiene copolymer are also disclosed. For example, the ethylene/butadiene copolymer may be useful in the production of tires.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire may be a race tire, passenger tire, aircraft tire, agricultural, earthmover, off-the-road, truck tire, and the like. In one embodiment, the tire is a passenger or truck tire. The tire may also be a radial or bias.

The rubber composition may also be used in other products, including but not limited to non-pneumatic tires, belts, hoses, shoes, airsprings, engine mounts, and the like.

The rubber composition may optionally include, in addition to the ethylene-butadiene copolymer, one or more rubbers or elastomers containing olefinic unsaturation. The phrases "rubber or elastomer containing olefinic unsaturation" or "diene-based elastomer" are intended to include both natural rubber and its various raw and reclaim forms as well as various synthetic rubbers. In the description, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propyleneldiene monomer (EPDM), and in particular, ethylene/propylenel dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In some embodiments, at least one additional rubber is preferably of at least two of diene-based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In some embodiments, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene-based rubbers.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British*

*Standard* 2000 Parts, 2003, 62nd edition, published by the Institute of Petroleum, United Kingdom.

The rubber composition may include from about 10 to about 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed are precipitated silicas such as, for example, those obtained by the acidification of a soluble silicate, e.g., sodium silicate.

Such conventional silicas might be characterized, for example, by having a BET (Brunauer-Emmett-Teller) surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc.; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 $cm^3$/100 g.

Other fillers may be used in the rubber composition including, but not limited to, particulate fillers including ultra-high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. The patents mentioned in the preceding sentence are incorporated by reference herein in their entireties. Such other fillers may be used in an amount ranging from 1 to 30 phr.

In some embodiments, the rubber composition may contain a conventional sulfur containing organosilicon compound. In one embodiment, the sulfur containing organosilicon compounds are the 3,3'-bis(trimethoxy or triethoxy silylpropyl) polysulfides. In one embodiment, the sulfur containing organosilicon compounds are 3,3-bis(triethoxysilylpropyl) disulfide and/or 3,3'-bis(triethoxysilylpropyl) tetrasulfide.

In some embodiments, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535, which is incorporated by reference herein in its entirety. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used include amines, disulfides, guanidines, thioureas, thiazoles, thiurams, sulfenamides, dithiocarbamates and xanthates. In one embodiment, the primary accelerator is a sulfenamide If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire may be a race tire, passenger tire, aircraft tire, agricultural, earthmover, off-the-road, truck tire, and the like. In one embodiment, the tire is a passenger or truck tire. The tire may also be a radial or bias.

The rubber composition may also be used in other products, including but not limited to non-pneumatic tires, belts, hoses, shoes, airsprings, engine mounts, and the like.

Vulcanization of the pneumatic tire may be carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

Figure 3:
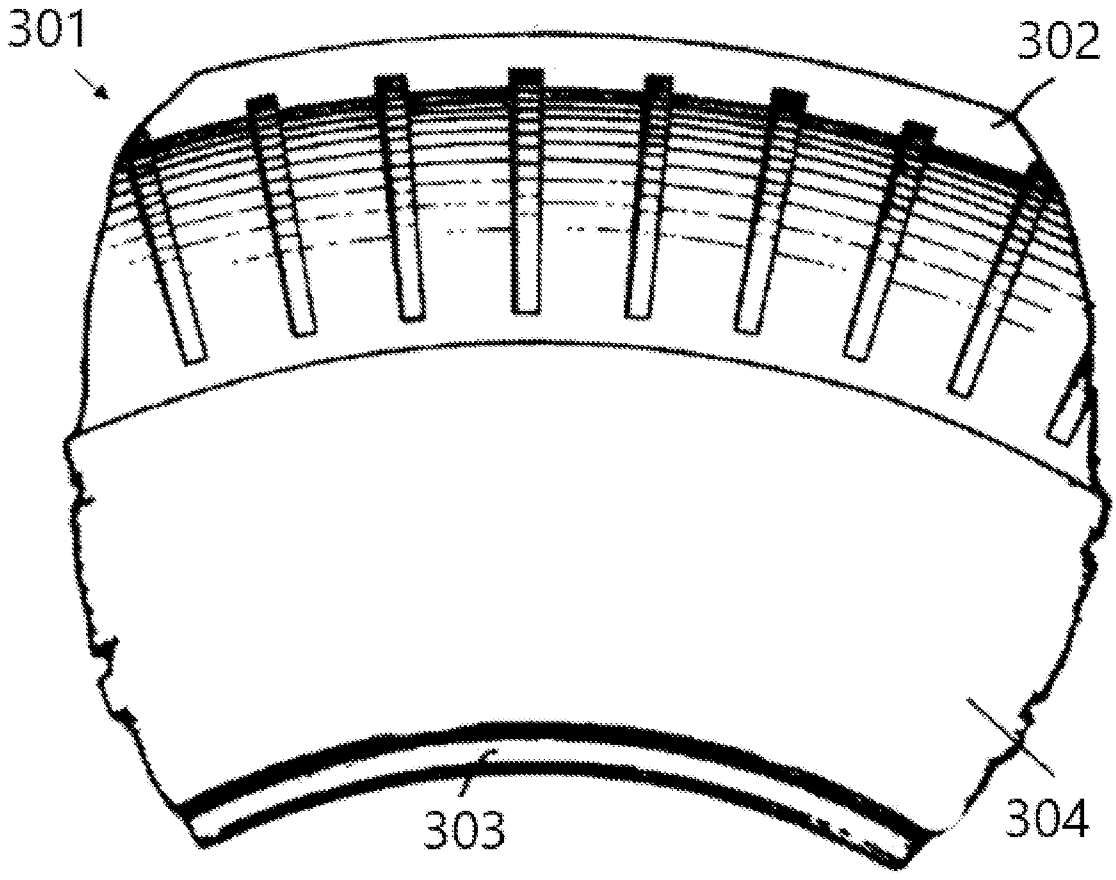
FIG. 3 is a partial side view of a non-limiting example of a tire in accordance with some embodiments of the present disclosure.

FIG. 3 is a partial side view of a non-limiting example of a tire 301 in accordance with some embodiments of the present disclosure. The tire 301 includes a tread portion 302, a bead portion 303, and a sidewall portion 304 located between the tread portion 302 and the bead portion 303. The tread portion 302, bead portion 303, and sidewall portion 304 of tires in accordance with the present disclosure are not limited to the particular configuration depicted in FIG. 3. For example, there may be multiple sidewall portions, ribs, patterns, colors, etc. FIG. 3 is provided to illustrate one example of where a composition containing a copolymer produced according to the process of the present disclosure may be utilized. The copolymer may be utilized in one or more of the tread portion 302, bead portion 303, and sidewall portion 304.

Figure 4:
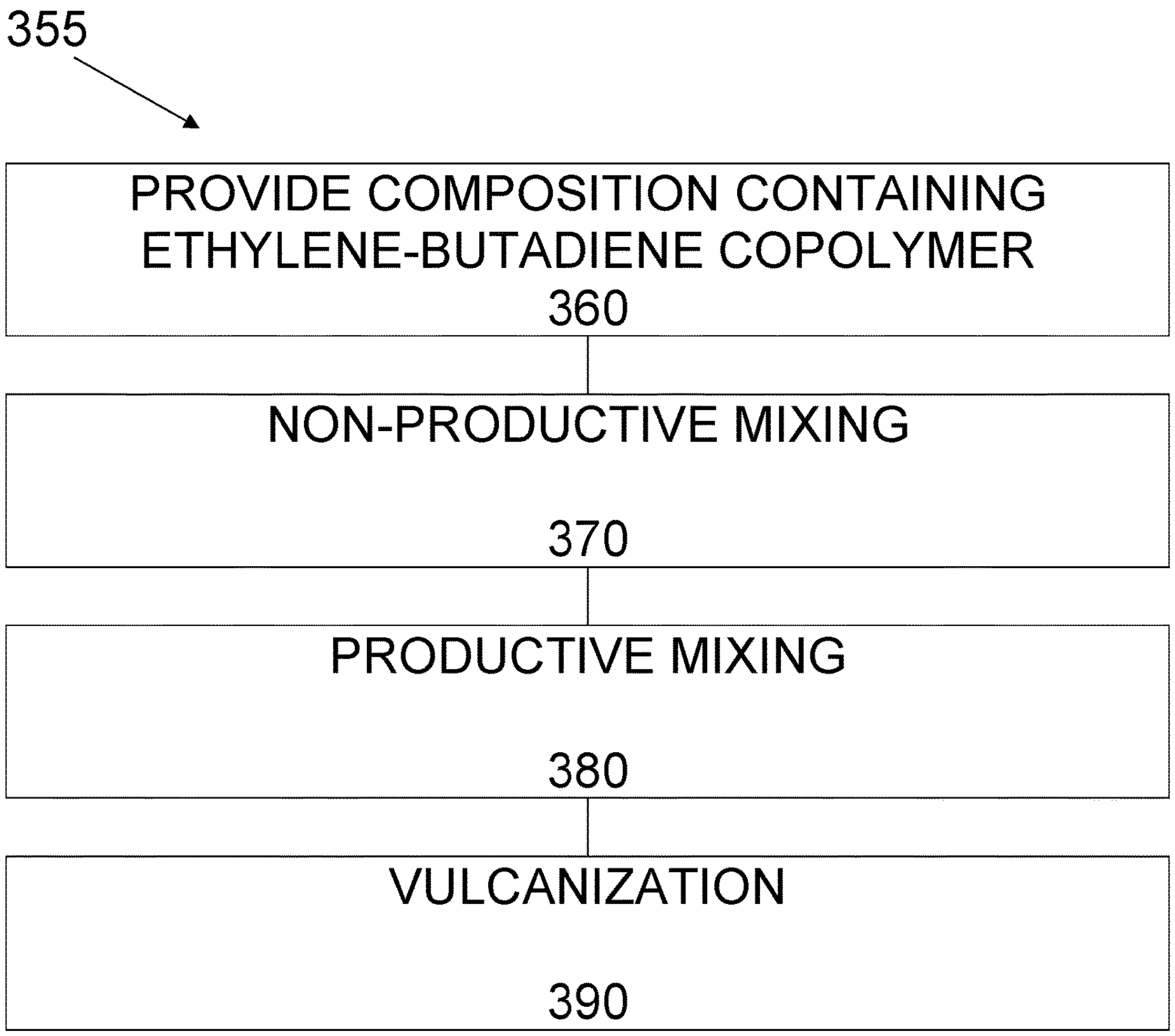
FIG. 4 is a flow chart illustrating a non-limiting example of an article formation process in accordance with some embodiments of the present disclosure.

FIG. 4 is a flow chart illustrating a non-limiting example of a process 455 of forming an article (e.g., a tire) in accordance with some embodiments of the present disclosure. The process 455 includes providing the composition 460 containing an ethylene-butadiene copolymer, non-productive mixing 470, productive mixing 480, and vulcanization 490.

The following examples are provided to illustrate the devices and methods of the present disclosure. The examples are merely illustrative and are not intended to limit the disclosure to the materials, conditions, or process parameters set forth therein.

EXAMPLES

Butadiene premix was prepared in toluene (15% by weight) and dried over a column of dried alumina/sieves. Premix was charged in a 4-oz boston round bottle. The solution was saturated with ethylene gas by flushing with a stream of ethylene for~5 minutes. Catalyst solution was prepared under inert atmosphere in toluene by dissolving 7.4 mg (0.0164 mmol) of Tris[(trimethylsilyl)methyl]scandium (CAS 872992-17-1) in 2 mL toluene, followed by the addition of MMAO-12 (100 eq, 1.64 mmol, 1.52 mL of 7% solution). An additional aliquot of MMAO-12 (100 eq, 1.64 mmol, 1.52 mL of 7% solution) was charged to the polymerization vessel, followed by the entirety of the scandium catalyst solution. The bottle was heated to 50° C. for 3 hours, then terminated by an isopropanol/BHT solution and allowed to evaporate to remove solvent. The resulting polymer was analyzed by 1H NMR and 13C NMR to determine ethylene incorporation. By 13C NMR, the polymer was found to be 62% cis, 33% trans, and 5% vinyl. The ethylene incorporation measured by 1H NMR was found to be 7.4 mol %.

This written description uses examples to describe the disclosure, including the best mode, and also to enable any person skilled in the art to make and use the disclosure. Other examples that occur to those skilled in the art are intended to be within the scope of the present disclosure if they have structural elements that do not differ from the same concept, or if they include equivalent structural elements with insubstantial differences. It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims

I claim:

1. A process for producing an ethylene-butadiene copolymer comprising:

copolymerizing butadiene with ethylene in the presence of a catalyst system comprising:

tris[(trimethylsilyl)methyl]scandium; and an aluminum-containing activator.

2. The process of claim 1, wherein the catalyst system further comprises:

a borate coactivator.

3. The process of claim 2, wherein the borate coactivator comprises a salt of tetrakis(3,5-bis(trifluoromethyl)phenyl) borate and/or a salt of tetrakis(pentafluorophenyl)borate.

4. The process of claim 1, wherein the aluminum-containing activator is an aluminoxane activator.

5. The process of claim 4, wherein the aluminoxane activator is a modified aluminoxane activator.

6. The process of claim 4, wherein the aluminoxane activator is a methylaluminoxane activator.

7. The process of claim 6, wherein the methylaluminoxane activator is a modified methylaluminoxane activator.

8. The process of claim 1, wherein the aluminum-containing activator comprises MMAO-12.

9. The process of claim 1, wherein the aluminum-containing activator comprises a trialkyl aluminum activator; and wherein the catalyst system further comprises:

a borate coactivator.

10. The process of claim 9, wherein the trialkyl aluminum activator comprises triisobutylaluminum.

11. The process of claim 9, wherein the borate coactivator comprises a salt of tetrakis(3,5-bis(trifluoromethyl)phenyl) borate.

12. The process of claim 9, wherein the borate coactivator comprises a salt of tetrakis(pentafluorophenyl)borate.

13. The process of claim 1, wherein a molar ratio of the aluminum-containing activator to tris[(trimethylsilyl)methyl]scandium is in a range of about 20 to about 1000.

14. The process of claim 1, further comprising:

quenching a reaction product of the copolymerization.

15. The process of claim 14, further comprising:

drying the quenched reaction product.

16. The process of claim 14, wherein the reaction product is quenched with a quenching composition comprising isopropanol and butylated hydroxytoluene.

17. A process for producing an ethylene-butadiene copolymer comprising:

providing a first composition comprising butadiene and ethylene to a reactor;

providing a second composition comprising tris[(trimethylsilyl)methyl]scandium and a first aliquot of an aluminum-containing activator to the reactor; and copolymerizing butadiene with ethylene.

18. The process of claim 17, wherein the first composition further comprises a second aliquot of the aluminum-containing activator.

19. The process of claim 17, further comprising:

quenching a reaction product of the copolymerization; and drying the quenched reaction product.

20. The process of claim 17, wherein (a) the aluminum-containing activator comprises a modified aluminoxane activator; or (b) the aluminum-containing activator comprises a trialkyl aluminum activator and at least one of the first composition and the second composition further comprises a borate coactivator.

* * * * *